United States Patent
Klar et al.

(10) Patent No.: US 8,922,422 B2
(45) Date of Patent: Dec. 30, 2014

(54) FMCW RADAR SENSOR FOR MOTOR VEHICLES

(75) Inventors: Michael Klar, Magstadt (DE); Thomas Binzer, Stuttgart (DE); Stefan Heilmann, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 836 days.

(21) Appl. No.: 13/139,683

(22) PCT Filed: Oct. 20, 2009

(86) PCT No.: PCT/EP2009/063730
§ 371 (c)(1),
(2), (4) Date: Dec. 22, 2011

(87) PCT Pub. No.: WO2010/072437
PCT Pub. Date: Jul. 1, 2010

(65) Prior Publication Data
US 2012/0169525 A1 Jul. 5, 2012

(30) Foreign Application Priority Data
Dec. 15, 2008 (DE) .......... 10 2008 054 624

(51) Int. Cl.
*G01S 7/28* (2006.01)
*G01S 13/93* (2006.01)
*G01S 7/40* (2006.01)
*G01S 13/34* (2006.01)
*H01Q 1/32* (2006.01)
*H01Q 3/22* (2006.01)
*H01Q 21/00* (2006.01)

(52) U.S. Cl.
CPC ............. *G01S 7/4004* (2013.01); *G01S 13/345* (2013.01); *H01Q 1/3233* (2013.01); *H01Q 3/22* (2013.01); *H01Q 21/0037* (2013.01); *G01S 13/931* (2013.01); *G01S 2007/4039* (2013.01); *G01S 2013/9321* (2013.01); *G01S 2013/9325* (2013.01)
USPC .............................. 342/70; 342/175

(58) Field of Classification Search
CPC ....... G01S 13/931; G01S 7/032; G01S 13/34; G01S 2013/9375; G01S 13/282; G01S 13/48; H01Q 1/3233; H01Q 21/08; H01Q 25/008
USPC .............. 342/70–72, 175; 340/435–436, 903; 701/301
See application file for complete search history.

(56) References Cited

U.S. PATENT DOCUMENTS 5,731,778 A * 3/1998 Nakatani et al. ............... 342/70
5,926,134 A 7/1999 Pons et al.
(Continued)

FOREIGN PATENT DOCUMENTS

DE  19638149       9/1996
DE  10246607 A1 * 4/2004
(Continued)

OTHER PUBLICATIONS

Klaus Solbach et al., Antenna Technology for Millimeter Wave Automotive Sensors, European Microwave Conference, 29th IEEE, Oct. 1, 1999, pp. 139-142.

(Continued)

*Primary Examiner* — John B Sotomayor
(74) *Attorney, Agent, or Firm* — Kenyon & Kenyon LLP

(57) ABSTRACT

FMCW radar sensor for motor vehicles, having at least one antenna element and a modulation device for feeding the antenna element using a frequency-modulated transmission signal, whose frequency periodically sweeps a frequency band, characterized in that the antenna element has multiple subelements, which are positioned in a vertical column and fed serially, and the modulation device is implemented for the purpose of variably setting the frequency position of the frequency band.

20 Claims, 4 Drawing Sheets

(56) References Cited

U.S. PATENT DOCUMENTS

| | | | |
|---|---|---|---|
| 6,031,483 A * | 2/2000 | Urabe et al. | 342/70 |
| 6,927,699 B2 * | 8/2005 | Samukawa et al. | 340/903 |
| 7,427,930 B2 * | 9/2008 | Arnold et al. | 340/933 |
| 7,786,928 B2 * | 8/2010 | Hansen et al. | 342/175 |
| 7,924,170 B1 * | 4/2011 | Arnold et al. | 340/907 |
| 8,593,333 B2 * | 11/2013 | Wintermantel et al. | 342/70 |
| 8,779,995 B2 * | 7/2014 | Kirino et al. | 343/713 |
| 2004/0145512 A1 * | 7/2004 | Takano et al. | 342/70 |
| 2004/0145513 A1 * | 7/2004 | Katayama et al. | 342/70 |
| 2005/0017891 A1 * | 1/2005 | Kuroda et al. | 342/70 |
| 2005/0116854 A1 * | 6/2005 | Beez et al. | 342/70 |
| 2005/0285773 A1 * | 12/2005 | Hartzstein et al. | 342/70 |
| 2007/0002305 A1 | 1/2007 | Lehre et al. | |
| 2007/0152871 A1 | 7/2007 | Puglia | |
| 2008/0258964 A1 * | 10/2008 | Schoeberl et al. | 342/189 |
| 2008/0297400 A1 * | 12/2008 | Hansen et al. | 342/70 |
| 2011/0074620 A1 * | 3/2011 | Wintermantel | 342/70 |
| 2011/0074621 A1 * | 3/2011 | Wintermantel | 342/70 |
| 2011/0080314 A1 * | 4/2011 | Wintermantel | 342/147 |
| 2012/0169525 A1 * | 7/2012 | Klar et al. | 342/70 |
| 2013/0234881 A1 * | 9/2013 | Binzer | 342/70 |
| 2014/0104097 A1 * | 4/2014 | Binzer et al. | 342/74 |

FOREIGN PATENT DOCUMENTS

| | | |
|---|---|---|
| DE | 102007056910 | 5/2009 |
| EP | 0498524 | 8/1992 |
| EP | 1624317 | 2/2006 |
| JP | 2001-183456 | 7/2001 |
| JP | 2004-101347 | 4/2004 |
| WO | WO 03/073125 | 9/2003 |
| WO | WO 2007/026792 | 3/2007 |

OTHER PUBLICATIONS

International Search Report, PCT International Patent Application No. PCT/2009/063730, Dated Feb. 2, 2010.

\* cited by examiner

FMCW RADAR SENSOR FOR MOTOR VEHICLES

RELATED APPLICATION INFORMATION

The present application is a U.S. national phase patent application of PCT application PCT/EP2009/063730, which was filed on Oct. 20, 2009, and which claims priority to and the benefit of German patent application no. DE 102008054624.0, which was filed in Germany on Dec. 15, 2008, the disclosures of which are incorporated herein by reference.

FIELD OF THE INVENTION

The present invention relates to an FMCW radar sensor for motor vehicles, having at least one antenna element and one modulation device for feeding the antenna element with a frequency-modulated transmission signal, whose frequency periodically sweeps a frequency band.

BACKGROUND INFORMATION

In conventional FMCW radar sensors (frequency modulated continuous wave), the frequency is modulated in the form of a ramp within a fixed frequency band, for example alternately using a rising frequency ramp and a falling frequency ramp.

The received radar echo is mixed with a component of the transmission signal, so that an intermediate frequency signal is obtained, whose frequency corresponds to the frequency difference between transmission signal and received signal. A located object is shown in the spectrum of the intermediate frequency signal in the form of a peak, whose apex frequency is a function of the signal runtime and thus the distance of the object and, because of the Doppler effect, also the relative velocity of the object. By comparing the apex frequencies of two peaks, which originate from the same object and of which one was obtained on the rising frequency ramp and the other on the falling frequency ramp, the distance and the relative velocity of the object may be determined.

A monostatic antenna concept is common, in which the antenna elements are used both for transmitting and also for receiving.

Multiple antenna elements are typically positioned in the horizontal adjacent to one another in front of a shared microwave lens. The radar radiation of each antenna element is bundled by the lens and emitted in an established main emission direction, which is a function of the location of the relevant antenna element. In this way, a multibeam radar is obtained, which covers a larger angle range in the horizontal, i.e., in the azimuth, and allows the azimuth angle of the object to be determined by comparing the amplitudes and phases of the radar echoes received by various antenna elements.

Fundamentally, instead of a microwave lens or in combination therewith, group antennas may also be used for beam shaping and for establishing the emission direction, the group antennas having multiple individual antennas, which are actuated using different phases, so that the desired emission characteristic results from interference effects.

For example, German Patent Application No. DE 196 38 149 describes a group antenna, using which the emission direction may be influenced not only in the azimuth, but also in the elevation (in the vertical). The use of antenna elements having multiple subelements which are positioned in the vertical and serially fed is also described, whereby an antenna characteristic which varies as a function of the frequency of the transmission signal is obtained in the elevation.

SUMMARY

An object of the present invention is to create an FMCW radar sensor for motor vehicles, which allows a more reliable location of objects in front of the vehicle, in particular of preceding vehicles.

This object may be achieved according to the present invention in that the antenna element has a plurality of subelements, which are positioned in a vertical column and have serially fed subelements, and in that the modulation device is implemented for the purpose of variably setting the frequency position of the frequency band.

The present invention allows, using a simply constructed radar sensor, which differs from a conventional FMCW radar sensor only through relatively slight modifications, the emission characteristic—and, in the case of a monostatic antenna concept, also the receiving characteristic—to be varied as needed in the elevation within specific limits, simply by varying the frequency position of the frequency band. The variation of the frequency position is particularly simple for the reason that the modulation device, which is required in any case for modulating the transmission frequency within the frequency band, may be used for this purpose.

The construction of the antenna elements from multiple serially fed subelements has the result that the frequency modulation within the particular frequency band also results in a specific variation of the emission characteristic in the vertical. Since this modulation occurs periodically having a relatively short cycle time, however, it only results in "wobbling" of the radar beam in the vertical, which does not impair the function of the radar sensor as a whole and is even advantageous, because it results in a certain expansion of the locating range in the vertical. For the duration of multiple successive measuring cycles, which are required for reliably locating an object, the frequency position of the frequency band remains virtually constant, so that the evaluation of the received signal is not made more difficult.

In practical use of the radar sensor in the motor vehicle, the possibility of varying the directional characteristic in the elevation offers several noteworthy advantages. For example, maladjustments of the radar sensor in the elevation may be corrected simply by adapting the frequency band, without the installation of the radar sensor having to be changed.

When traveling in hilly country, for example, before a hilltop or when entering a valley, the radar beam may be tracked in the elevation, so that even objects which are weak and/or further away may not be so easily lost from the locating range. Signals of an inclination sensor installed in the vehicle, for example, (optionally using extrapolation of the change of the vehicle inclination in the future) or also the data of a digital map of a navigation system may be used for the recognition of the particular form of terrain.

Furthermore, when traveling on a level roadway, the locating of the objects and their characterization may also be improved by changing the elevation. For example, the elevation may be optimized in each case by a suitable algorithm in such a way that particularly strong radar echoes are obtained. It is optionally also possible to differentiate between taller and flatter objects by varying the elevation while following a located object, so that the objects may be better characterized, for example, as trucks, passenger automobiles, guard rails on the roadway edge, or completely irrelevant objects such as manhole covers or tin cans on the roadway surface.

If a radar sensor in a driver assistance system of a motor vehicle is used, for example, for automatic adaptive cruise control or in a so-called precrash system for collision warning, for collision avoidance, or for preparing passive safety systems for an imminent collision, an important safety requirement is that one may be sure at all times that the radar sensor is actually functional and is not blinded because of a snow or ice covering on the radar lens, for example. An automatic blindness recognition has been problematic up to this point above all, however, because even in the case of a blinded radar sensor, reflections, which may be incorrectly interpreted as located object, indeed occur. In the case of a real object, however, it is to be expected that the radar echo changes in some form if the emission characteristic is changed in elevation. The reflections which occur on a blinded radar sensor are however independent of the elevation. The present invention thus also allows particularly simple and reliable blindness recognition.

BRIEF DESCRIPTION OF THE DRAWINGS

An exemplary embodiment of the present invention is shown in the figures and explained in greater detail below.

DETAILED DESCRIPTION OF EXAMPLE EMBODIMENTS

Figure 1:
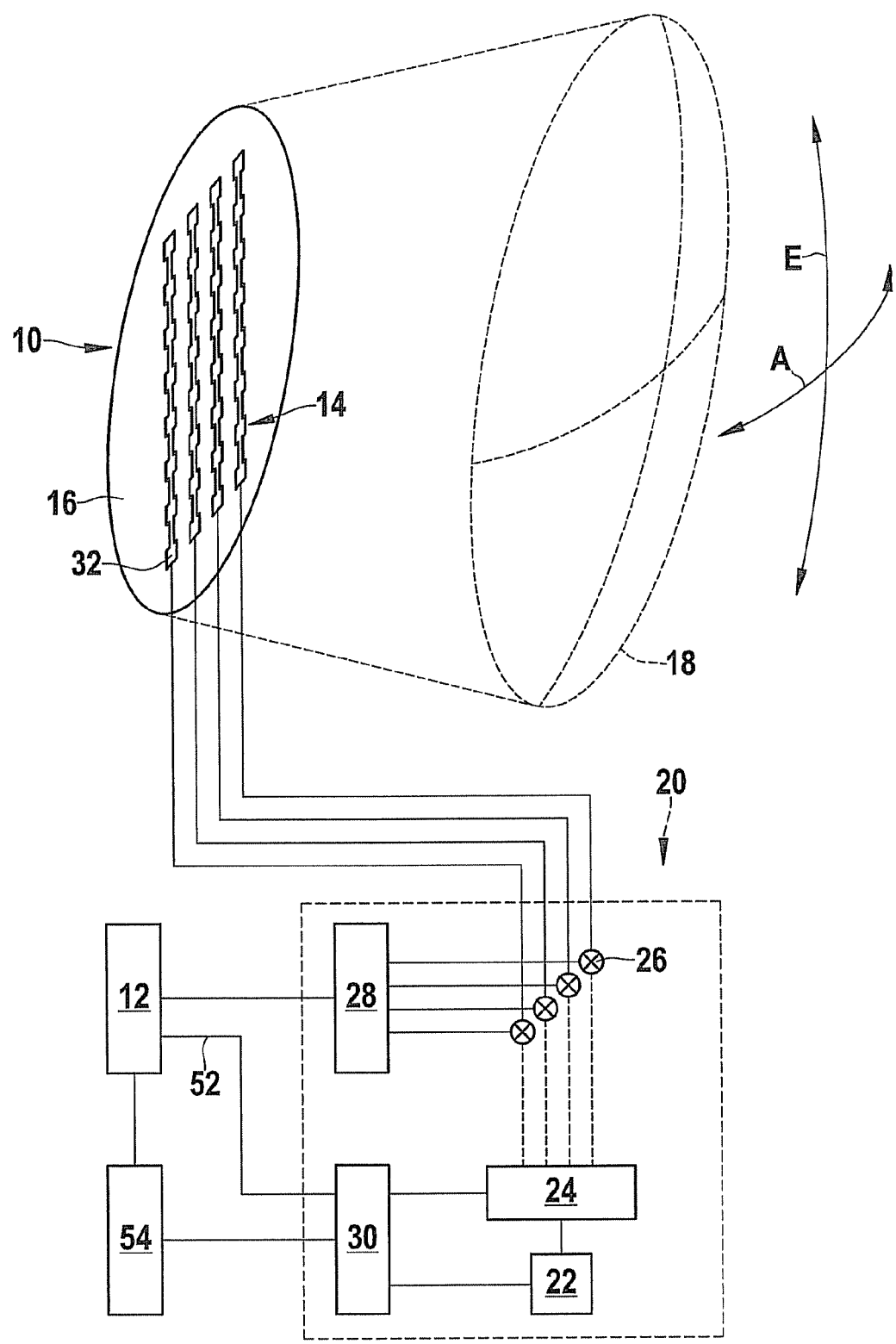
FIG. 1 shows a schematic sketch of an example FMCW radar sensor according to the present invention and an associated evaluation device in a driver assistance system of a motor vehicle.

FIG. 1 shows, in a simplified block diagram, the main components of a driver assistance system for motor vehicles, for example, an adaptive cruise control (ACC), having a radar sensor 10 installed in the vehicle and an evaluation device 12 in the form of an electronic data processing system. Radar sensor 10 is used to locate preceding vehicles, and evaluation device 12 interferes, on the basis of the locating data of the radar sensor, in the drive and braking systems of the vehicle, in order to regulate the velocity of the vehicle in such a way that a vehicle, which is directly preceding in the same lane, is followed at an appropriate safety distance.

Radar sensor 10 has a circuit board 16, which is equipped with antenna elements 14 (four in the example shown), and which is positioned at a distance to a microwave lens 18. A drive circuit 20, which is shown as a block in FIG. 1, is positioned at or on circuit board 16, having a voltage-controlled oscillator 22, a phase-locked loop 24, one mixer 26 for each of antenna elements 14, a transducer and preprocessing stage 28, and a control unit 30. Oscillator 22, phase-locked loop 24, and control unit 30 together form a modulation device, which produces a frequency-modulated transmission signal supplied via mixer 26 to each of antenna elements 14. In the example shown, each antenna element 14 is fed using the same signal, but specific embodiments are also possible, in which the individual antenna elements are fed using different transmission signals, which differ in their frequency and/or phase, for example.

In the example shown, a monostatic antenna concept is implemented, i.e., antenna elements 14 are not only used for emitting the radar beams, but also for receiving the radar echo. In mixers 26, the signal received by appropriate antenna element 14 is mixed with the transmission signal for the same antenna element, so that an intermediate frequency signal is obtained, which is supplied to transducer and preprocessing stage 28. This is where the intermediate frequency signals are digitized and preprocessed. In particular, each individual signal recorded within an established measuring cycle is dispersed by fast Fourier transform into a spectrum, which is then analyzed to identify located objects and to determine their distance and the relative velocity, as well as their azimuth angle. The locating data thus obtained are supplied to evaluation device 12, where they are further evaluated.

Antenna elements 14 are staggered on circuit board 16 in the horizontal direction relative to the optical axis of microwave lens 18, so that the radar radiation, which is emitted by the individual antenna elements and is bundled by the microwave lens, is emitted in each case at a somewhat different azimuth angle, as symbolized in FIG. 1 by a double arrow A. This process allows the azimuth angle of the located objects to be determined by comparison of the signals obtained from various antenna elements 14.

Figure 2:
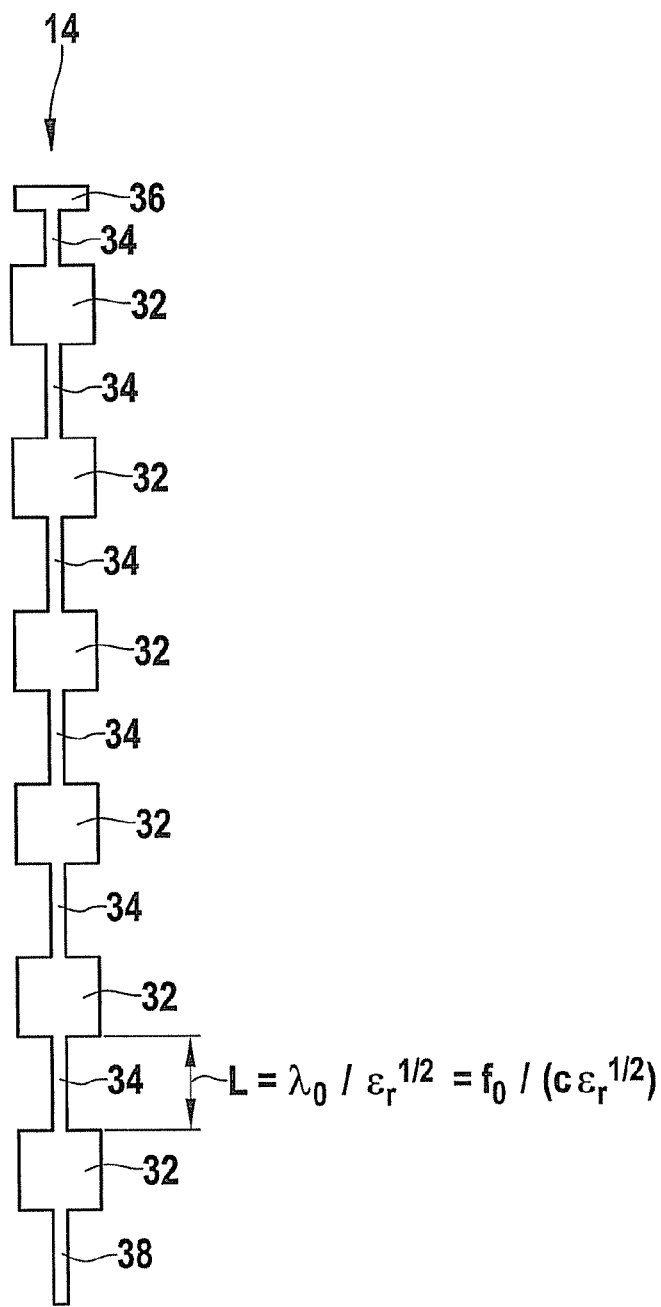
FIG. 2 shows a simplified view of an antenna element of the radar sensor according to FIG. 1.

As is more clearly shown in FIG. 2, antenna element 14 includes a sequence of patches or subelements 32, which are positioned at equal intervals in a vertical column and are connected to one another in series by microwave lines 34. The column of subelements 32 is closed without reflection at one end, at the upper end in the example shown, by a closing element 36, and the patch at the opposing end of the column is connected by a feed line 38 to mixer 26 (FIG. 1), so that subelements 32 are fed in serial using the transmission signal. Microwave lines 34, which connect the individual subelements to one another, are shown running linearly in the example shown, however, they may also be implemented as meandering indirect lines, for example. Their length L is dimensioned so that it corresponds to the wavelength $\lambda_0 / \in_r^{1/2}$ of a standard transmission signal, which has a standard frequency $f_0$ of 77 GHz, for example. The dielectric constant of the substrate on which the subelements are located.

If the transmission signal has exactly frequency $f_0$, all subelements 32 are consequently excited to in-phase oscillations, with the result that the radar signals emitted by the individual subelements are in phase and are superimposed to form a directed beam, which is emitted in the direction perpendicular to antenna element 14. Since antenna elements 14 are centered in the example shown in the vertical on the optical axis of microwave lens 18, upon correct installation of the radar sensor, the maximum of the emitted radiation is at an elevation angle of 0° (horizontal).

However, if the frequency of the transmission signal is changed in relation to standard frequency $f_0$, slight phase shifts result between individual subelements 32. A deflection of the radar beam in the elevation results therefrom, as symbolized in FIG. 1 by double arrow E. Since the relationship between the deflection angle and the frequency of the transmission signal is known, through suitable selection, the frequency of the deflector and thus the elevation angle of the maximum of the emitted radiation (and at the same time the maximum of the sensitivity for the radar echo) may be set as needed.

Figure 3:
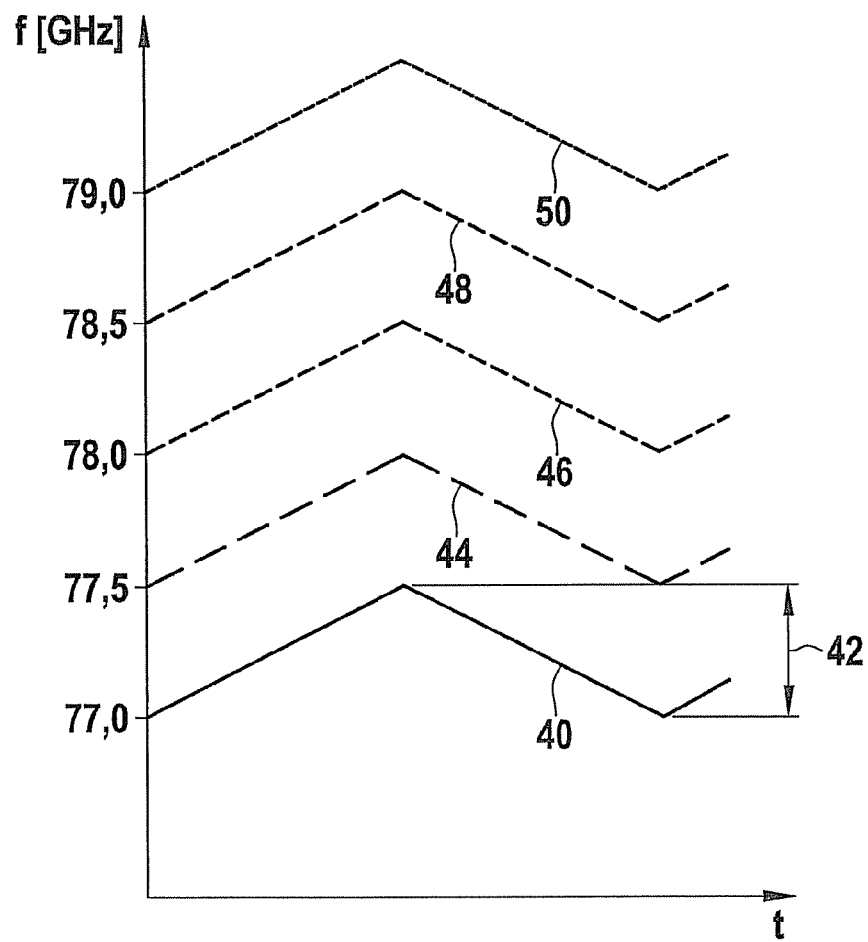
FIG. 3 shows a frequency-time graph for the radar sensor according to FIG. 1.

Depending on the functional principle of an FMCW radar, frequency f of the transmission signal is modulated in the form of a ramp, as shown in FIG. 3 in a time graph. For example, curve 40 in FIG. 3 indicates a frequency curve, in which the frequency varies within a specific frequency band 42, whose lower limit is equal to standard frequency $f_0$ of 77 GHz. Curves 44-50 in FIG. 3 illustrate corresponding frequency curves, in which frequency band 42 is shifted in each case by 0.5 GHz toward higher frequencies.

Figure 4:
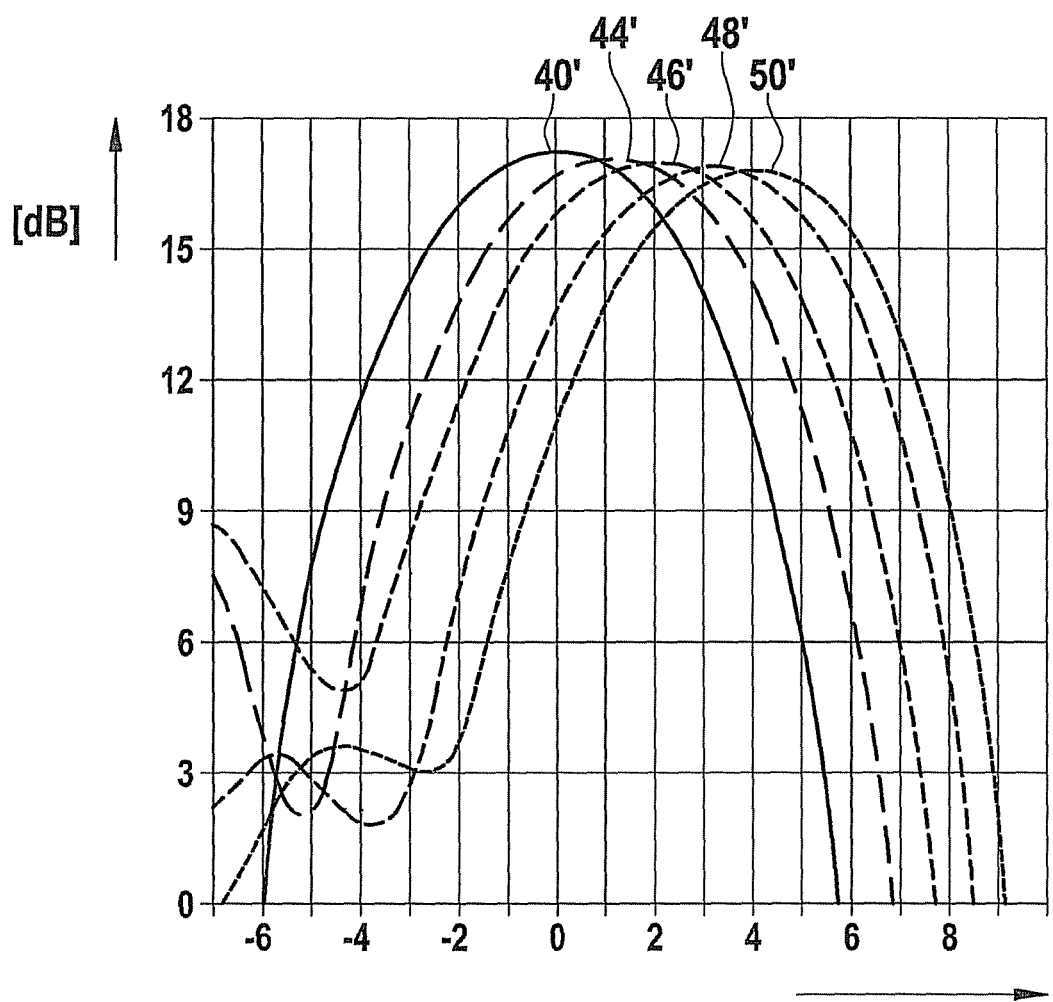
FIG. 4 shows various elevation directional characteristics of the radar sensor according to FIG. 1.

FIG. 4 shows the dependency of the directional characteristic in the elevation on frequency f of the transmission signal. Curves 40' and 44'-50' in FIG. 1 correspond to the frequencies 77.0 GHz, 77.5 GHz, 78.0 GHz, 78.5 GHz, and 79 GHz, respectively. It may be seen that the elevation angle may be increased by up to +4° (upward), in that the frequency of the transmission signal is increased by 2 GHz in relation to standard frequency $f_0$. Of course, lowering of the radar beam to negative elevation angles is possible, as well, by reducing the frequency in relation to the standard frequency.

On the basis of the modulation of the transmission signal shown in FIG. 3, the main emission direction and thus the main sensitivity direction of the radar beam each correspond to the elevation angle which is associated with the middle of the frequency band.

The frequency increase or frequency decrease in relation to standard frequency $f_0$ selected to set the elevation angle may in practice be greater or smaller than the width of frequency band 42. In order to not make the evaluation of the radar signal unnecessarily difficult, however, the width of frequency band 42 and the shape of the modulation curve are not to be changed, but rather only shifted on the frequency axis.

In the example shown in FIG. 1, a driver output 52 of evaluation device 12 is connected to control unit 30. Via this driver output 52, the evaluation device may give the command to control unit 30 to change the elevation angle. For example, the elevation angle may be increased if evaluation device 12 determines that, while its own vehicle is located on a downgrade, the signal of the located preceding vehicle is becoming weaker, although the distance and the azimuth angle of this vehicle have hardly changed. In this situation, it is to be assumed that the preceding vehicle has reached a valley and thus has traveled upward out of the locating range, so that the elevation angle is to be increased to track the object with a radar beam.

In addition, a special functional module 54 of evaluation device 12 is shown as a separate block, which is also connected to control unit 30 of the radar sensor, in FIG. 3. This functional module 54 is used to automatically recognize possible blinding of the radar sensor, for example, because of a snow or ice covering on microwave lens 18. A typical indication of blinding of the radar sensor is that the received reflection pattern is independent from the elevation of the radar beam. Accordingly, functional module 54, when it performs a blindness recognition, gives the command to control unit 30 to change the elevation angle, for example, to scan once through the entire range of achievable elevation angles, while evaluation device 12 is checking whether this process results in any change in the received signal. If this is not the case, blinding of the radar sensor may be concluded with the result that the driver assistance system deactivates itself and outputs a specific warning message to the driver.

What is claimed is
1. An FMCW radar sensor for a motor vehicle, comprising:
at least one antenna element having an emission characteristic;
a microwave lens having at least one directionality characteristic; and
at least one driving circuit having a modulation device, the modulation device variably setting a frequency position of a frequency band to alter a specific variation of the emission characteristic in a direction extending along the directionality characteristic;
wherein the antenna element has multiple subelements which are positioned in a vertical column and fed serially.

2. The radar sensor as recited in claim 1, wherein the antenna element is a mono static element.

3. The radar sensor as recited in claim 2, wherein the directionality characteristic is an elevation angle during a transmission phase and a receiving angle during a receiving phase.

4. The radar sensor as recited in claim 1, wherein the radar sensor includes multiple antenna elements which are staggered respective to one another in a horizontal direction.

5. The radar sensor as recited in claim 1, wherein the antenna element is positioned on a circuit board which is in turn positioned at a distance to the microwave lens.

6. The FMCW radar sensor as recited in claim 1, wherein the directionality characteristic is an elevation angle.

7. The FMCW radar sensor as recited in claim 1, wherein the at least one driving circuit further includes at least one mixer, a transducer and a preprocessing phase.

8. The FMCW radar sensor as recited in claim 1, wherein the at least one antenna element further includes:
a feed line,
a closing element, and
multiple microwave lines, including:
a first microwave line connecting, at a distal end of the vertical column of multiple subelements, a subelement to the closing element;
a second microwave line connecting, at a proximal end of the vertical column of multiple subelements, a subelement to the feed line; and
other microwave lines connecting in series the multiple subelements, wherein the feed line is connected to a mixer.

9. The FMCW radar sensor as recited in claim 8, wherein the other microwave lines are dimensioned so that their length corresponds to a wavelength $\lambda_0/\epsilon_r^{1/2}$, and wherein $\epsilon_r$ is a dielectric constant of a substrate on which the subelements are located, and wherein $\lambda_0$ is a number calculated by a frequency of a transmission signal in the frequency band being divided by a speed of light in a vacuum.

10. The FMCW radar sensor as recited in claim 1, wherein the modulation device includes:
a control unit,
a phase lock loop, and
a voltage controlled oscillator.

11. The FMCW radar sensor as recited in claim 1, further comprising:
one of an inclination sensor or a navigation system configured to (i) recognize a particular form of terrain over which the vehicle is travelling and (ii) set the frequency position of the frequency band to alter the specific variation of the emission characteristic accordingly.

12. A driver assistance system for a motor vehicle, comprising:
an FMCW radar sensor including at least one antenna element having an emission characteristic, a microwave lens having at least one directionality characteristic, and at least one driving circuit having a modulation device for variably setting a frequency position of a frequency band to alter a specific variation of the emission characteristic in a direction extending along the directionality characteristic;
wherein the antenna element has multiple subelements which are positioned in a vertical column and fed serially.

13. The driver assistance system as recited in claim 12, wherein the directionality characteristic is an elevation angle.

14. The driver assistance system as recited in claim 12, wherein the at least one driving circuit further includes at least one mixer, a transducer and a preprocessing phase.

15. The driver assistance system as recited in claim 12, wherein the FMCW radar sensor further includes an evaluation device which intervenes in one of a braking system or a drive system of the vehicle in order to regulate a velocity of the vehicle in such a way that a directly preceding vehicle is followed at an appropriate safety distance.

16. The driver assistance system as recited in claim 12, wherein the FMCW radar sensor further includes a functional module to automatically recognize possible blinding of the FMCW radar sensor.

17. The driver assistance system as recited in claim 12, wherein the at least one antenna element further includes:
   a feed line,
   a closing element, and
   multiple microwave lines, a first microwave line connecting at a distal end of the vertical column of multiple subelements, a subelement to the closing element, a second microwave line connecting, at a proximal end of the vertical column of multiple subelements, a subelement to the feed line, and other microwave lines connecting in series the multiple subelements,
   wherein the feed line is connected to a mixer.

18. A driver assistance system for a motor vehicle, comprising:
   an FMCW radar sensor including:
      a microwave lens having at least one directionality characteristic; and
      at least one circuit board including:
         at least one antenna element having an emission characteristic, the antenna element having multiple subelements which are positioned in a vertical column and fed serially, and
         at least one driving circuit including a modulation device for variably setting a frequency position of a frequency band to alter a specific variation of the emission characteristic in a direction extending along the directionality characteristic.

19. A driver assistance system for a motor vehicle, comprising:
   an FWCM radar sensor including at least one antenna element having an emission characteristic, at least one microwave lens having at least one directionality characteristic, and at least one driving circuit having a modulation device for variably setting a frequency position of a frequency band to alter a specific variation of the emission characteristic in a direction extending along the directionality characteristic; and
   a functional module which is configured to cause a change of the frequency position of the frequency band and to recognize blinding of the radar sensor when a received signal remains unaffected by the change of the frequency position,
   wherein the antenna element has multiple subelements which are positioned in a vertical column and fed serially.

20. The driver assistance system as recited in claim 19, wherein the directionality characteristic is an elevation angle, and wherein the modulation device includes:
   a phase lock loop,
   a voltage controlled oscillator, and
   a control unit changing the elevation angle, wherein the control unit receives a first signal from the functional module and sends a second signal to each of the phase lock loop and the voltage controlled oscillator.

* * * * *